US008907035B2

(12) United States Patent
Fantinel et al.

(10) Patent No.: US 8,907,035 B2
(45) Date of Patent: Dec. 9, 2014

(54) POLYETHYLENE COPOLYMERS

(75) Inventors: Fabiana Fantinel, Frankfurt (DE); Shahram Mihan, Bad Soden (DE); Gerd Mannebach, Münstermaifeld (DE); Volker Dolle, Bensheim (DE)

(73) Assignee: Basell Polyolefine GmbH, Wesseling (DE)

( * ) Notice: Subject to any disclaimer, the term of this patent is extended or adjusted under 35 U.S.C. 154(b) by 33 days.

(21) Appl. No.: 13/143,962

(22) PCT Filed: Jan. 13, 2010

(86) PCT No.: PCT/EP2010/000118
§ 371 (c)(1),
(2), (4) Date: Aug. 16, 2011

(87) PCT Pub. No.: WO2010/081676
PCT Pub. Date: Jul. 22, 2010

(65) Prior Publication Data
US 2011/0294975 A1    Dec. 1, 2011

Related U.S. Application Data

(60) Provisional application No. 61/205,220, filed on Jan. 20, 2009.

(30) Foreign Application Priority Data

Jan. 13, 2009 (EP) .................... 09150465

(51) Int. Cl.
C08F 10/14 (2006.01)
C08L 23/08 (2006.01)
C08F 210/16 (2006.01)
C08F 4/659 (2006.01)

(52) U.S. Cl.
CPC .......... *C08F 210/16* (2013.01); *C08F 4/65912* (2013.01); *C08F 4/65916* (2013.01)
USPC ..................... 526/348.3; 526/348.2

(58) Field of Classification Search
USPC ............................ 526/172, 352, 348.2, 348.3
See application file for complete search history.

(56) References Cited

U.S. PATENT DOCUMENTS

| | | | |
|---|---|---|---|
| 3,242,150 A | 3/1966 | Scoggin | |
| 3,248,179 A | 4/1966 | Norwood | |
| 4,245,062 A | 1/1981 | Suzuki | |
| 4,521,566 A | 6/1985 | Galli | |
| 4,734,459 A | 3/1988 | Cecchin | |
| 5,350,807 A | 9/1994 | Pettijohn | |
| 5,360,868 A | 11/1994 | Mosier et al. | |
| 6,441,081 B1 | 8/2002 | Sadatoshi | |
| 6,953,829 B2 | 10/2005 | Kratzer | |
| 7,101,940 B2 | 9/2006 | Schottek | |
| 2002/0035210 A1 | 3/2002 | Silvestri | |

FOREIGN PATENT DOCUMENTS

| | | |
|---|---|---|
| EP | 0100843 | 6/1983 |
| EP | 0533154 A1 | 3/1993 |
| EP | 0533155 A1 | 3/1993 |
| EP | 0533156 A1 | 3/1993 |
| EP | 0533160 A1 | 3/1993 |
| EP | 0633272 A1 | 1/1995 |
| WO | WO-9102012 | 2/1991 |
| WO | WO9102012 | 2/1991 |
| WO | WO-92/00333 | 1/1992 |
| WO | WO-95/32995 | 12/1995 |
| WO | WO-97/04015 | 2/1997 |
| WO | WO-99/21899 | 5/1999 |
| WO | WO-00/31090 | 6/2000 |
| WO | WO-01/21674 | 3/2001 |
| WO | WO-01/62764 | 8/2001 |
| WO | WO-2003066699 A1 | 8/2003 |
| WO | WO-2004/087807 | 10/2004 |
| WO | WO-2005/103095 | 11/2005 |
| WO | WO-2005/103096 | 11/2005 |

(Continued)

OTHER PUBLICATIONS

Pasch, Harald et al., "Analysis of Polyolefin blends by crystallization analysis fractionation", Marcomol. Mater. Eng. 279 2000, 46-51.

(Continued)

*Primary Examiner* — Ling Choi
*Assistant Examiner* — Chun-Cheng Wang

(57) ABSTRACT

A multimodal ethylene copolymer having the following properties:
i) density comprised in the range from 0.880 to 0.955 g/cm3;
ii) total comonomer content ranging from 6% to 25% by weight;
iii) content of 1-butene derived units ranging from 0 to 2% by weight;
iv) Mw/Mn comprised from 4 to 20;
v) intrinsic viscosity (decalin at 135° C. as determined according to EN ISO 1628-312003) comprised between 1.0 and 4.0 dL/g;
said multimodal ethylene copolymer comprises from 10% to 80% by weight of a first polyethylene component and being detected at the Crystaf® apparatus at a temperature higher than 75° C. and from 90% to 20% by weight of a second polyethylene component being a copolymer being detected at a Crystaf® apparatus at a temperature lower than 75° C.; wherein said multimodal ethylene copolymer being fractionated into 12 fractions by means of the Holtrup analysis, the fractions containing more than 2% by weight of the total amount of material meet the following relationship:

$$Cf/HDPE > -0.0075 HDPE + 0.58;$$

wherein Cf is the amount (% wt) of comonomer of formula $CH_2=CHT$ in the copolymer of the fraction and HDPE is the amount (% wt) of the homopolymer component present in the fraction.

12 Claims, No Drawings

(56) References Cited

FOREIGN PATENT DOCUMENTS

| | | | |
|---|---|---|---|
| WO | WO-2005/113672 | | 12/2005 |
| WO | WO-2006/067023 | | 6/2006 |
| WO | WO-2006066952 A1 | | 6/2006 |
| WO | WO-2007/012406 | | 1/2007 |
| WO | WO 2007/012406 | * | 2/2007 |
| WO | WO-2007/060115 | | 5/2007 |
| WO | WO-2008/074715 | | 6/2008 |
| WO | WO-2008/077530 | | 7/2008 |
| WO | WO-2010081753 | | 7/2010 |

OTHER PUBLICATIONS

Ratzsch, M. et al., "Bimodal Polymer Materials based on PP and PE", Aufbereiten von Polymeren mit neuartigen Eigenschaften 1995, 1-22(3-25 VDI-Verlag).

Bohm, Ludwig L. et al., "High-Density Polyethylene Pipe Resins", Advanced Materials 4 No. 3 1992, 234-238.

Holtrup, Wolfgana, "Zur Fraktionierung von Polmeren durch Direktextraktion", Makromol. Chem. 178 1977, 2335-2349.

J. Brandrup and E. H. Immergut, Polymer Handbook, John Wiley & Sons, Inc. Edition 3, 1989, ISBN 0-471-81244-7, 7 pages.

* cited by examiner

POLYETHYLENE COPOLYMERS

This application is the U.S. national phase of International Application PCT/EP2010/000118, filed Jan. 13, 2010, claiming priority to European Patent Application 09150465.4 filed Jan. 13, 2009, and the benefit under 35 U.S.C. 119(e) of U.S. Provisional Application No. 61/205,220, filed Jan. 20, 2009; the disclosures of International Application PCT/EP2010/000118, European Patent Application 09150465.4 and U.S. Provisional Application No. 61/205,220, each as filed, are incorporated herein by reference.

The present invention relates to a multimodal polypropylene copolymers obtained by using a mixture of two catalyst components.

The properties of bimodal polyethylenes depend, firstly, on the properties of the components present. Secondly, the quality of mixing of the high molecular weight component and the low molecular weight component is of particular importance for the mechanical properties of the polyethylene. A poor mixing quality results, inter alia, in a low stress cracking resistance and adversely affects the creep behavior of pressure pipes made of polyethylene blends.

It has been found to be advantageous to use blends of a high molecular weight, low-density ethylene copolymer and a low molecular weight, high-density ethylene homopolymer, which have good stress cracking resistances, for hollow bodies and pressure pipes, as described, for example, by L. L. Böhm et al., Adv. Mater. 4, 234-238 (1992). Similar polyethylene blends are disclosed in EP-A-100 843, EP-A 533 154, EP-A 533 155, EP-A 533 156, EP-A 533 160 and U.S. Pat. No. 5,350,807.

Such bimodal polyethylene blends are often produced using reactor cascades, i.e. two or more polymerization reactors are connected in series, and the polymerization of the low molecular weight component occurs in one reactor and that of the high molecular weight component occurs in the next (cf. for example, M. Rätzsch, W. Neißl "Bimodale Polymerwerkstoffe auf der Basis von PP and PE" in "Aufbereiten von Polymeren mit neuartigen Eigenschaften", pp. 3-25, VDI-Verlag, Düsseldorf 1995). A disadvantage of this process is that relatively large amounts of hydrogen have to be added to produce the low molecular weight component. The polymers obtained in this way therefore have a low content of vinyl end groups, especially in the low molecular weight component. In addition, it is technically complex to prevent comonomers added in one reactor or hydrogen added as regulator from getting into the next reactor.

WO 2007/060115 relates to a polyethylene composition comprising from 50 to 89% by weight of a multimodal polyethylene obtained with a mixture of two catalyst components. Said multimodal component contains a first polyethylene component that is an homopolymer of an ethylene copolymer containing from less than 1% by weight of comonomer and a second polyethylene component containing more than 1% by weight of comonomer.

WO2007/012406 relates to a process for preparing a bimodal polyethylene polyethylene copolymer wherein the polymer comprises an high molecular weight component and a low molecular weight component. The polymerization is carried out in the presence of low amount of water or carbon dioxide. The low molecular weight component has a comonomer content of 0-1.5 mol %, while the higher molecular weight component has a comonomer content ranging from 0 to 15% by mol.

WO 2005/103095 relates to a polyethylene which comprises ethylene homopolymer and/or copolymer with alkenes obtained by using two single site catalyst component and having a distribution of molecular weigh comprised between 5 and 50. This document is silent about the amount of comonomer that can be present in the polymer.

WO2005/103096 relates to a polyethylene which comprises ethylene homopolymer and/or copolymer with alkenes obtained by using two single site catalyst component and having a distribution of molecular weigh comprised between 3 and 30. The polymer comprises from 0.01 to 5% by weight of comonomer.

The properties of bimodal polyethylene depend among other variables on the homogeneity of the mix between the high molecular weight component and the low molecular weight component. This can be achieved by an optimum balance of features between the two components in the fractions of polymers having the same molecular weight. Thus the applicant found that a multimodal ethylene copolymer having a particular balancement between the two components is endowed with better mechanical properties such as Charpy Notch measured at −30° C.

An object of the present invention is a multimodal ethylene copolymer wherein the comonomer is selected from the derived units of alpha olefins of formula $CH_2=CHT$ wherein T is a $C_3$-$C_{10}$ alkyl group; having the following properties:
i) density (ISO 1183) comprised in the range from 0.880 to 0.955 g/cm$^3$; preferably from 0.890 and 0.935 g/cm$^3$; more preferably from 0.910 to 0.932 g/cm$^3$, even more preferably from 0.920 to 0.930 g/cm$^3$;
ii) total comonomer content ranging from 6% to 25% by weight; preferably from 6% to 12% by weight more preferably ranging from 7% to 11% by weight; more preferably from 7% to 9% by weight;
iii) content of 1-butene derived units ranging from 0 to 2% by weight, preferably from 0.1 to 1% by weight;
iv) Mw/Mn comprised from 4 to 20, preferably from 5 to 20 preferably from 6 to 11;
v) intrinsic viscosity (decalin at 135° C. as determined according to EN ISO 1628-312003) comprised between 1.0 and 4.0 dL/g, preferably between 1.2 and 3.0 dL/g;

said multimodal ethylene copolymer comprises from 10% to 80% by weight preferably from 40% to 80% by weight of a first polyethylene component (HDF) and being detected with the crystaf analysis at a temperature higher than 75° C. and from 90% to 20% by weight preferably from 60% to 20% by weight of a second polyethylene component (LDF) being a copolymer preferably containing from 5 to 40% by weight preferably from 10 to 30% by weight of derived units of alpha olefins of formula $CH_2=CHT$, being detected with the crystaf analysis at a temperature lower than 75° C.;

wherein said multimodal ethylene copolymer being fractionated into 12 fractions by means of the Holtrup analysis, the fractions containing more than 2% by weight of the total amount of material meet the following relationship:

$$Cf/HDPE > -0.0075 HDPE + 0.58;$$

wherein HDPE is the amount of polyethylene homopolymer present in the Holtrup fraction and Cf is the amount (% wt) of comonomer of formula $CH_2=CHT$ present in the ethylene copolymer of the Holtrup fraction.

For the purpose of the present invention unless otherwise indicated the term copolymer is referred to a polymer containing only two kinds of monomers derived units, such as for examples ethylene/1-butene or ethylene/1-hexene other monomers derived units can be present in an amount from 0 to 2% by weigh. In particular the term "ethylene copolymer" indicated a copolymer containing ethylene derived units in an amount higher than 50% by weigh.

Examples of alpha olefins of formula $CH_2\!=\!CHT$ are 1-butene, 1-pentene, 1-hexene, 1-octene, 1-decene, 1-dodecene. Preferred alpha olefins are 1-butene, 1-hexene and 1-octene; more preferably 1-hexene is used.

The multimodal ethylene copolymer according to the present invention shows a multimodal distribution, preferably at least bimodal distribution at TREF analysis. This means that the TREF analysis evidenced at least two maximum peaks.

The total comonomer content of the multimodal copolymer of the present invention ranges from 6% to 25% by weight, preferably from 6% to 12% by weight more preferably from 7% to 11% by weight; even more preferably from 7% to 9% by weight. When the comonomer content is lower or higher the resulting polymer does not show the optimum distribution between ethylene homopolymer and ethylene copolymer.

The applicant discovered that the 1-butene derived units are present in the copolymer even without adding 1-butene during the polymerization reaction. Without wishing to be bound by a theory it is believed that the 1-butene derived units are due to the dimerization process of ethylene catalyzed by the iron containing catalyst system that is used to obtain the polymer object of the present invention.

The broad molecular weight distribution of the polymer object of the present invention allows a better processability of the polymer. This fact has to be combined with the multimodal composition of the polymer, so that it is possible to improve the processability of the polymer without losing the positive features of the polymers having a narrow distribution of molecular weight.

The intrinsic viscosity (decalin at 135° C. as determined according to EN ISO 1628-312003) is comprised between 1.0 and 4.0 dL/g, preferably between 1.2 and 3 dL/g; lower or higher values of IV does not allow the optimum processability of the copolymer of the present invention.

The multimodal ethylene copolymer object of the present invention is subjected to the solvent-non-solvent extraction method (Holtrup) (W. Holtrup, Makromol. Chem. 178, 2335 (1977)). The multimodal ethylene copolymer is fractionated into 12 fractions at different solvent-non-solvent content according to the scheme on the following table:

| Solvent<br>Xylene | Non-solvent<br>Butyldiglychol |
|---|---|
| 75 ml | 325 ml |
| 125 ml | 275 ml |
| 170 ml | 230 ml |
| 200 ml | 200 ml |
| 220 ml | 180 ml |
| 232 ml | 168 ml |
| 240 ml | 160 ml |
| 244 ml | 156 ml |
| 248 ml | 152 ml |
| 252 ml | 148 ml |
| 260 ml | 140 ml |
| 400 ml | — |

Each fraction is then analyzed. The applicant found that when each fraction meets the relationships specified above the resulting product shows better mechanical properties such as elastic modulus, and Charpy notch.

Preferably said multimodal ethylene copolymer being fractionated into 12 fractions by means of the Holtrup analysis, the fractions containing more than 2% by weight of the total amount of material meet the following relationship:

$$Cf/HDPE > -0.0075 HDPE + 0.60;$$

The multimodal ethylene copolymer of the present invention can be used as such or in blend with other polymers such as polypropylene. It can be used for the production of sheets, or for injection moulding due to the high processability.

The multimodal ethylene copolymer of the present invention is obtained by contacting ethylene with an alpha olefins of formula $CH_2\!=\!CHT$ wherein T is a $C_3$-$C_{10}$ alkyl group under polymerization conditions in the presence of a catalyst system obtainable by contacting:

A) a metallocene compound of formula (I)

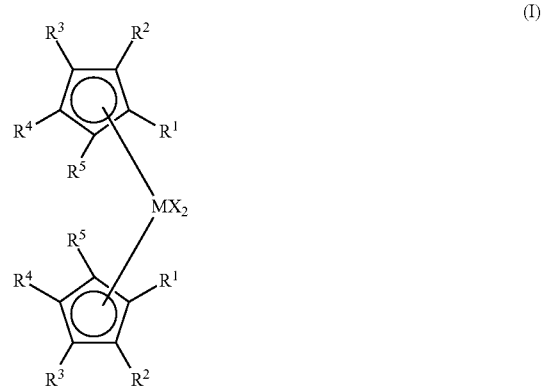

Wherein
M is titanium, zirconium or hafnium;
X, equal to or different from each other, are hydrogen atoms, halogen atoms, R, OR, $OSO_2CF_3$, OCOR, SR, $NR_2$ or $PR_2$ groups, wherein R is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radical, optionally containing heteroatoms belonging to groups 13-17 of the Periodic Table of the Elements; or two X can optionally form a substituted or unsubstituted butadienyl radical or a OR'O group wherein R' is a divalent radical selected from $C_1$-$C_{20}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group; more preferably X is chlorine or a methyl radical;
$R^1$, $R^2$, $R^3$, and $R^4$, equal to or different from each other, are hydrogen atoms or $C_1$-$C_{40}$ hydrocarbon radicals optionally containing heteroatoms belonging to groups 13-17 of the Periodic Table of the Elements;
$R^5$, equal to or different from each other, are hydrogen atoms, $C_1$-$C_{40}$ hydrocarbon radicals optionally containing heteroatoms belonging to groups 13-17 of the Periodic Table of the Elements, or two $R^5$ can be joined to form a bridging divalent group L, wherein L is selected from $C_1$-$C_{20}$ alkylidene, $C_3$-$C_{20}$ cycloalkylidene, $C_6$-$C_{20}$ arylidene, $C_7$-$C_{20}$ alkylarylidene, or a $C_7$-$C_{20}$ arylalkylidene radicals, optionally containing heteroatoms belonging to groups 13-17 of the Periodic Table of the Elements, or it is a silylidene radical containing up to 5 silicon atoms; preferably L is $Si(R^{11})_2$ or $CH_2\!-\!CH_2$ wherein $R^{11}$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; more preferably L is $Si(CH_3)_2$ or $CH_2\!-\!CH_2$;
Preferably $R^1$, $R^2$, $R^3$, $R^4$ and $R^5$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$- alkylaryl or $C_7$-$C_{40}$-arylalkyl radicals optionally containing heteroatoms belonging to groups 13-17 of the Periodic Table of the Elements; more preferably R', $R^2$, $R^3$, $R^4$ and $R^5$ are hydrogen atoms $C_1$-$C_{10}$-alkyl or $C_6$-$C_{40}$-aryl radicals;

Even more preferably $R^2$, $R^4$, and $R^5$ are hydrogen atoms and $R^1$ and $R^3$ are $C_1$-$C_{10}$-alkyl radicals; preferably R1 is a $C_3$-$C_6$ alkyl radical preferably a butyl radical and $R^3$ is a methyl radical;

B) an iron complexes of the general formula (II)

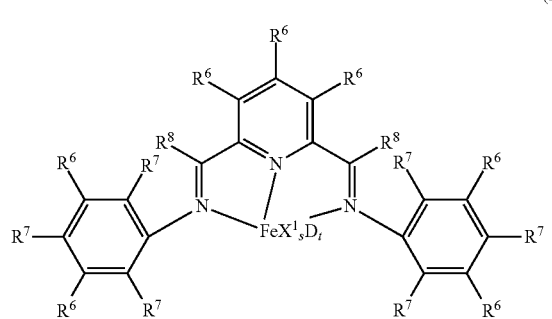

Wherein:
the radicals $X^1$, equal to or different from each other, are hydrogen atoms, halogen atoms, R, OR, $OSO_2CF_3$, OCOR, SR, $NR_2$ or $PR_2$ groups, wherein R is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radical, optionally containing heteroatoms belonging to groups 13-17 of the Periodic Table of the Elements; or two $X^1$ can optionally form a substituted or unsubstituted butadienyl radical or a OR'O group wherein R' is a divalent radical selected from $C_1$-$C_{20}$ alkylidene, $C_6$-$C_{40}$ arylidene, $C_7$-$C_{40}$ alkylarylidene and $C_7$-$C_{40}$ arylalkylidene radicals; preferably $X^1$ is a hydrogen atom, a halogen atom or a R group; more preferably X is chlorine or a methyl radical;

D is an uncharged donor; s is 1, 2, 3 or 4, preferably s is 2 or 3; t ranges from 0 to 4, preferably t is 0, 1 or 2.

$R^6$, equal to or different from each other, are hydrogen atoms or $C_1$-$C_{40}$ hydrocarbon radicals optionally containing heteroatoms belonging to groups 13-17 of the Periodic Table of the Elements; preferably $R^6$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements; more preferably $R^6$ are hydrogen atoms or $C_1$-$C_{10}$-alkyl radicals;

$R^7$, equal to or different from each other, are hydrogen atoms or $C_1$-$C_{40}$ hydrocarbon radicals optionally containing heteroatoms belonging to groups 13-17 of the Periodic Table of the Elements; preferably $R^7$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements; more preferably $R^7$ are $C_1$-$C_{10}$-alkyl radicals such as methyl or isopropyl radicals;

$R^8$, equal to or different from each other, are hydrogen atoms or $C_1$-$C_{40}$ hydrocarbon radicals optionally containing heteroatoms belonging to groups 13-17 of the Periodic Table of the Elements; preferably $R^8$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements; more preferably $R^8$ are $C_1$-$C_{10}$-alkyl radicals such as methyl or ethyl;

C) an alumoxane or a compound capable of forming an alkyl cation with complex of formula (I) and (II);
wherein the molar ratio between the metallocene compound of formula (I) and the iron complex of formula (II) (M/Fe ratio) ranges from 5:1 to 30:1; preferably from 10:1 to 20:1.

The alumoxanes used in the catalyst system according to the invention are considered to be linear, branched or cyclic compounds containing at least one group of the type:

$$\begin{array}{c} U \\ | \\ Al-O \end{array}$$

wherein the substituents U, same or different, are defined above.

In particular, alumoxanes of the formula:

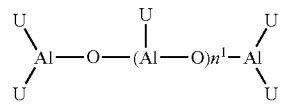

can be used in the case of linear compounds, wherein $n^1$ is 0 or an integer of from 1 to 40 and the substituents U are defined as above; or alumoxanes of the formula:

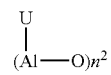

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are:
tris(2,3,3-trimethyl-butyl)aluminium, tris(2,3-dimethylhexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl) aluminium, tris(2-ethyl-3-methyl-butyl)aluminium, tris(2-ethyl-3-methyl-pentyl)aluminium, tris(2,3-diethyl-pentyl) aluminium, tris(2-propyl-3-methyl-butyl)aluminium, tris(2- isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBA), tris(2,4,4-trimethyl-pentyl)aluminium (TIOA), tris(2,3-dimethylbutyl)aluminium (TDMBA) and tris(2,3,3-trimethylbutyl)aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Tributylammoniumtetra(pentafluorophenyl)aluminate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylcarbeniumtetrakis(pentafluorophenyl)borate,
Triphenylcarbeniumtetrakis(pentafluorophenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and
N,N-Dimethylaniliniumtetrakis(pentafluorophenyl)borate.

The catalysts system to be used in the process of the present invention can be supported on an inert carrier. This is achieved by depositing the metallocene compound A) and the iron complexes B) or the product of the reaction thereof with the component C), or the component C) and then the metallocene compound A) and the iron complex B) on an inert support. The support can be a porous solid such as talc, a sheet silicate, an inorganic oxide or a finely divided polymer powder (e.g. polyolefin). Suitable inorganic oxides may be found among the oxides of elements of groups 2, 3, 4, 5, 13, 14, 15 and 16 of the Periodic Table of the Elements. Examples of oxides preferred as supports include silicon dioxide, aluminum oxide, and also mixed oxides of the elements calcium, aluminum, silicon, magnesium or titanium and also corresponding oxide mixtures, magnesium halides, styrene/divinylbenzene copolymers, polyethylene or polypropylene. Other inorganic oxides which can be used alone or in combination with the abovementioned preferred oxidic supports are, for example, MgO, $ZrO_2$, $TiO_2$ or $B_2O_3$.

A suitable class of supports which can be used is that constituted by porous organic supports functionalized with groups having active hydrogen atoms. Particularly suitable are those in which the organic support is a partially crosslinked styrene polymer. Supports of this type are described in European application EP-633 272.

Another class of inert supports particularly suitable for use according to the invention is that of polyolefin porous prepolymers, particularly polyethylene.

A further suitable class of inert supports for use according to the invention is that of porous magnesium halides such as those described in International application WO 95/32995.

The support materials used preferably have a specific surface area in the range from 10 to 1000 $m^2/g$, a pore volume in the range from 0.1 to 5 ml/g and a mean particle size of from 1 to 500 µm. Preference is given to supports having a specific surface area in the range from 50 to 500 $m^2/g$, a pore volume in the range from 0.5 to 3.5 ml/g and a mean particle size in the range from 5 to 350 µm. Particular preference is given to supports having a specific surface area in the range from 200 to 400 $m^2/g$, a pore volume in the range from 0.8 to 3.0 ml/g and a mean particle size of from 10 to 300 µm.

The inorganic support can be subjected to a thermal treatment, e.g. to remove adsorbed water. Such a drying treatment is generally carried out at from 80 to 300° C., preferably from 100 to 200° C., with drying at from 100 to 200° C. preferably being carried out under reduced pressure and/or a blanket of inert gas (e.g. nitrogen), or the inorganic support can be calcined at from 200 to 1000° C. to produce the desired structure of the solid and/or set the desired OH concentration on the surface. The support can also be treated chemically using customary desiccants such as metal alkyls, preferably aluminum alkyls, chlorosilanes or $SiCl_4$, or else methylaluminoxane. Appropriate treatment methods are described, for example, in WO 00/31090.

The inorganic support material can also be chemically modified. For example, treatment of silica gel with $(NH_4)_2SiF_6$ leads to fluorination of the silica gel surface, or treatment of silica gels with silanes containing nitrogen-, fluorine- or sulfur-containing groups leads to correspondingly modified silica gel surfaces.

Organic support materials such as finely divided polyolefin powders (e.g. polyethylene, polypropylene or polystyrene) can also be used and are preferably likewise freed of adhering moisture, solvent residues or other impurities by means of appropriate purification and drying operations before use. It is also possible to use functionalized polymer supports, e.g. supports based on polystyrene, via whose functional groups, for example ammonium or hydroxy groups, at least one of the catalyst components can be immobilized. The solid compound obtained by supporting the catalyst system object of the present invention on a carrier in combination with the further addition of the alkylaluminium compound either as such or prereacted with water if necessary, can be usefully.

The molar ratio between the metallocene compound of formula (I) and the iron complex of formula (II) (M/Fe molar ratio) ranges from 2:1 to 20:1; preferably from 4:1 to 15:1; more preferably from 6:1 to 11:1; even more preferably from 6:1 to 8:1.

The process of the invention for polymerizing ethylene with 1-alkenes of formula $CH_2$=CHT can be carried out using all industrially known polymerization methods at temperatures in the range from –60 to 350° C., preferably from 0 to 200° C. and particularly preferably from 25 to 150° C., and under pressures of from 0.5 to 4000 bar, preferably from 1 to 100 bar and particularly preferably from 3 to 40 bar. The polymerization can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes and gas-phase fluidized-bed processes are all possible.

The polymerizations are usually carried out at temperatures in the range from –60 to 350° C., preferably in the range from 20 to 300° C., and under pressures of from 0.5 to 4000 bar. The mean residence times are usually from 0.5 to 5 hours, preferably from 0.5 to 3 hours. The advantageous pressure and temperature ranges for carrying out the polymerizations usually depend on the polymerization method. In the case of high-pressure polymerization processes, which are customarily carried out at pressures of from 1000 to 4000 bar, in particular from 2000 to 3500 bar, high polymerization temperatures are generally also set. Advantageous temperature ranges for these high-pressure polymerization processes are from 200 to 320° C., in particular from 220 to 290° C. In the case of low-pressure polymerization processes, it is usual to set a temperature which is at least a few degrees below the softening temperature of the polymer. In particular, temperatures of from 50 to 180° C., preferably from 70 to 120° C., are set in these polymerization processes. In the case of suspension polymerizations, the polymerization is usually carried out in a suspension medium, preferably an inert hydrocarbon such as isobutane or mixtures of hydrocarbons or else in the monomers themselves. The polymerization temperatures are generally in the range from –20 to 115° C., and the pressure is generally in the range from 1 to 100 bar. The solids content of the suspension is generally in the range from 10 to 80%. The polymerization can be carried out either batchwise, e.g. in stirring autoclaves, or continuously, e.g. in tube reactors, preferably in loop reactors. Particular preference is given to employing the Phillips PF process as described in U.S. Pat. No. 3,242,150 and U.S. Pat. No. 3,248,179. The gas-phase polymerization is generally carried out in the range from 30 to 125° C. at pressures of from 1 to 50 bar.

Among the abovementioned polymerization processes, particular preference is given to gas-phase polymerization, in particular in gas-phase fluidized-bed reactors, solution polymerization and suspension polymerization, in particular in loop reactors and stirred tank reactors. The gas-phase polymerization can also be carried out in the condensed or supercondensed mode, in which part of the circulating gas is cooled to below the dew point and is recirculated as a two-phase mixture to the reactor. Furthermore, it is possible to use a multizone reactor in which the two polymerization zones are linked to one another and the polymer is passed alternately through these two zones a number of times. The two zones can also have different polymerization conditions. Such a reactor is described, for example, in WO 97/04015. The different or identical polymerization processes can also, if desired, be connected in series so as to form a polymerization cascade, for example as in the Hostalen® process. A parallel reactor arrangement using two or more identical or different processes is also possible. Furthermore, molar mass regulators, for example hydrogen, or customary additives such as antistatics can also be used in the polymerizations. Hydrogen can especially be used to enhance the activity of the hafnocene (A). The hydrogen and increased temperature usually lead to lower z-average molar mass.

The polymerization is preferably carried out in a single reactor, in particular in a gas-phase reactor. The polymerization of ethylene with 1-alkenes having from 3 to 10 carbon atoms gives the polyethylene of the invention when the catalyst of the invention is used. The polyethylene powder obtained directly from the reactor displays a very high homogeneity, so that, unlike the case of cascade processes, subsequent extrusion is not necessary in order to obtain a homogeneous product.

The production of polymer blends by intimate mixing of individual components, for example by melt extrusion in an extruder or kneader (cf., for example, "Polymer Blends" in Ullmann's Encyclopedia of Industrial Chemistry, $6^{th}$ Edition, 1998, Electronic Release), is often accompanied by particular difficulties. The melt viscosities of the high and low molecular weight components of a bimodal polyethylene blend are extremely different. While the low molecular weight component is quite fluid at the customary temperatures of about 190-210° C. used for producing the blends, the high molecular weight component is only softened ("lentil soup"). Homogeneous mixing of the two components is therefore for very difficult. In addition, it is known that the high molecular weight component can easily be damaged as a result of thermal stress and by shear forces in the extruder, so that the properties of the blend are adversely affected. The mixing quality of such polyethylene blends is therefore often unsatisfactory. The preparation of the polyethylene of the invention in the reactor reduces the energy consumption, requires no subsequent blending processes and makes simple control of the molecular weight distributions and the molecular weight fractions of the various polymers possible. In addition, good mixing of the polyethylene is achieved.

The following examples are given for illustrative purposes and do not intend to limit the scope of the invention.

EXAMPLES

NMR

NMR samples were placed in tubes under inert gas and, if appropriate, melted. The solvent signals served as internal standard in the $^1$H- and $^{13}$C-NMR spectra and their chemical shift was converted into the values relative to TMS.

Polyethylene Homopolymer (HDPE) Content

The HDPE content in each Holtrup fraction has been measured by subjecting each fraction to the crystaf analysis, the fraction detected at a temperature higher than 80° C. was considered as HDPE.

Density

The density [g/cm$^3$] was determined in accordance with ISO 1183.

GPC

The determination of the molar mass distributions and the mean s Mn, Mw, M$_z$ and Mw/Mn derived therefrom was carried out by means of high-temperature gel permeation chromatography on a WATERS 150 C using a method based on DIN 55672 and the following columns connected in series: 3× SHODEX AT 806 MS, 1× SHODEX UT 807 and 1× SHODEX AT-G under the following conditions: solvent: 1,2, 4-trichlorobenzene (stabilized with 0.025% by weight of 2,6-di-tert-butyl-4-methylphenol), flow: 1 ml/min, 500 µl injection volume, temperature: 140° C. The columns were calibrated with polyethylene standards with molar masses of from 100 bis 10$^7$ g/mol. The evaluation was carried out by using the Win-GPC software of Fa. HS-Entwicklungsgesellschaft für wissenschaftliche Hard- und Software mbH, Ober-Hilbersheim.

MFR

The Melt Flow Rate was determined at 190° C. under a load of 21.6 kg (190° C./21.6 kg) in accordance with ISO 1133.

Holtrup Analysis

Solvent-Non-Solvent Fractionation (Molecular Mass Fractionation):

The analysis was carried out according the procedure given in the literature by Holtrup (W. Holtrup, Zur Fraktionierung von Polymeren durch Direktextraktion, Makromol. Chem. 178, 2335-2349 (1977)).

The detailed procedure which was used is as follows:

The extraction was carried out in an apparatus described here in detail:

It consists of a thermocontrolled fractionation pot, a solvent reservoir pot and a vibromixer. Fractionation pot and solvent reservoir pot are equipped with a jacket to allow thermostated operation of the fractionation process.

The fractionation pot has at the bottom a discharge valve and there is a quartz wool filter covered with a perforated metal plate (1 cm thick; hole diameter 4 mm) on the bottom of the fractionation pot. The mixing plate is mounted 1 cm above the quartz wool filter. The transportation initiated by the mixing plate is directed to the bottom of the fractionation pot.

The vibromixer unit is able to ensure a homogenous mixture of the precipitated polymer in the solvent (the slurry).

The process:

The polymer sample is transferred into the fractionation pot; temperature is elevated in the jacket of the fractionation pot; the temperature internally is controlled to 130° C. and the first solvent mixture (400 ml in total) is transferred into the fractionation pot. The solvent mixture is preheated to 130° C. in the solvent reservoir pot. The mixing device (vibromixer) is started. It is to be controlled that the polymer material is distributed all over the solvent mixture. The extraction is carried out for 20 min. Afterwards the formed solphase is transferred through the opened valve of the fractionation pot into a erlenmeyer flask which is filled with 500 ml of cold acetone (T=–10° C.). The vibromixer is stopped in this moment. The slurry is stirred and the polymer precipitates. During the transfer the vibromixer is kept in operation to prevent a build up of a block on the filter. The precipitated polymer acetone slurry is filtered afterwards over a suction filter and separated from the solvent mixture by this. The polymer is dried under vacuum at 80° C. for 12 h.

After closing the bottom valve the next already preheated solvent-non-solvent mixture (typically higher in xylene concentration) is transferred from the preheating pot into the extraction pot. The vibromixer is started and the whole procedure is repeated.

The whole procedure of extracting and filtering is repeated several times acc. to the recipe and in the last step an extraction with pure xylene is done.

400 ml of solvent mixture is used; in the last step 400 ml of xylene.

The following mixtures have been used

|  | Solvent Xylene | Non-solvent Butyldiglychol |
|---|---|---|
| 1 | 75 ml | 325 ml |
| 2 | 125 ml | 275 ml |
| 3 | 170 ml | 230 ml |
| 4 | 200 ml | 200 ml |
| 5 | 220 ml | 180 ml |
| 6 | 232 ml | 168 ml |
| 7 | 240 ml | 160 ml |
| 8 | 244 ml | 156 ml |
| 9 | 248 ml | 152 ml |
| 10 | 252 ml | 148 ml |
| 11 | 260 ml | 140 ml |
| 12 | 400 ml | — |

TREF Analysis

The TREF analysis were carried out under the following conditions: solvent 1,2,4-trichloro-benzene, flow: 1 ml/min, heating rate: 1° C./min, amount of polymer 5-10 mg, support: silica gel.

Crystaf Analysis

Crystallization Analysis Fractionation (CRYSTAF) technique involves dissolving a sample in a solvent at high temperature, then cooling the solution slowly to cause fractionation of the sample based on solubility. For semi-crystalline samples, including blends, solubility depends primarily on crystallizability: portions of the sample that are more crystalline will precipitate out of solution at a higher temperature than portions of the sample that are less crystalline.

The relative amount of sample in solution as a function of temperature is measured using an infrared (IR) detector to obtain the cumulative solubility distribution. The soluble fraction (SF) is defined as the IR signal at the lowest temperature (at 0° C.) divided by the IR signal when all the sample is dissolved at high temperature, and corresponds to the weight fraction of sample that has not crystallized.

A commercial CRYSTAF 200 instrument (Polymer Char S. A., Valencia, Spain) with five stirred stainless steel vessels of 60 mL volume was used to perform this test. The technique is outlined in Harald Pasch*, Robert Brëll[2], Udo Wahner[2], Benjamin Monrabal[3] MACROMOL. MATER. E NG. 279, 46-51 (2000).

In contrast to the procedure in the literature given approximately 15 mg of sample were dissolved for 60 min at 160° C. in 30 mL of 1,2-dichlorobenzene. The solution was then stabilized for 90 min at 95° C.

The crystallization was carried out from 95 to 30° C. at a crystallization rate of 0.1° C./min.

A dual wavelength infrared detector with a heated flow through cell maintained at 150° C. was used to measure the polymer concentration in solution at regular intervals during the crystallization cycle; the measuring wavelength was 3.5 µm and the reference wavelength was 3.6 µm. The cumulative soluble concentration is measured as the polymer crystallizes while the temperature is decreased.

The CRYSTAF peak temperature and area are identified by the peak analysis module included in the CRYSTAF Software (Version 200 Lb^ PolymerChar, Valencia, Spain). The CRYSTAF peak finding routine identifies a peak temperature as a maximum in the dW/dT and the area between the largest positive inflections on either side of the identified peak in the derivative curve.

Comonomer Content

Comonomer content has been measured via NMR

Preparation of the Catalyst Systems

Component A)

Bis(n-butyl-cyclopentadienyl)hafnium dichloride is commercially available from Chemtura Inc.

Component B)

2,6-Bis[1-(2-Chlor-4,6-trimethylphenylimino)ethyl]pyridine was prepared as in example 1 of WO 98/27124 and reacted in an analogous manner with iron(II) chloride to give 2,6-2,6-Bis[1-(2-Chlor-4,6-trimethylphenylimino)ethyl]pyridine iron(II) dichloride, as likewise disclosed in WO98/27124.

Component C)

Methylalumoxane (MAO) was received from Albemarle as a 30% wt/wt toluene solution.

Support Pretreatment

XPO-2107, a spray-dried silica gel from Grace, was calcined at 600° C. for 6 hours and subsequently 2.5 Kg of the dried silica gel were put into a 10 L vessel and cooled at 10° C.

Preparation of the Catalyst System 1

In a 3.09 L reactor 3.3 Kg MAO (4.75 M in Toluene, 0.78 mol) were added. In a separated 0.5 L flask 73.7 g. component A were mixed with 12.7 g component B. The powder was transferred to the 3.09 L steel reactor and the flask flushed with 500 ml Toluene.

The mixture was stirred, cooled to −30° C. for one hour, then poured into the 10 L reactor very slowly "dropwise". The mixture was stirred for another 2 h. The resulting catalyst (5.4 Kg) was a free flowing powder and still contained 36% by weight of solvent (based on the total weight and calculated on the basis of complete application of all components to the support) and had an ivory colour. The content of hafnium was 60 μmol/g, the content of Iron was of 9 μmol/g. The molar ratio Hf+Fe:Al was of 69:90.

Preparation of the Catalyst System 2

In a 3.09 L reactor 4.46 L MAO (4.75 M in Toluene, 0.78 mol) were added. In a separated 0.5 L flask 86.1 g. component A were mixed with 9.9 g. component B. The powder was transferred to the steel reactor and the flask flushed with 2 ml Toluene.

The mixture was stirred cooled to −30° C. for one hour, then poured into the 30 L reactor very slowly "dropwise". The mixture was stirred for another 2 h. The catalysts was filtered and washed with 5 L heptane. The resulting catalyst (5.3 Kg) was a free flowing powder and still contained 23% by weight of solvent and had an ivory colour. The content of hafnium was 70 μmol/g, the content of Iron was of 7 μmol/g. The molar ratio Hf+Fe:Al was of 77:110.

Example 1

Polymerization

The polymerization of catalyst 2 was carried out in a fluidized-bed reactor having a diameter of 0.5 m. The polymerization temperature was 91° C. and the total pressure of the reactor was 24 bar-g. The catalyst 2 was injected and 0.2 g of triisobutylaluminum per hour were metered as scavenger. Comonomer used is 1-Hexene. 1-hexene (C6)/ethylene(C2) ratio was 0.15. $N_2$ has been used as inert gas. The output productivity and the composition of the reactor gas are reported in table 1.

TABLE 1

| ex | gas speed $m^3$/h | Ethylene (% by vol) | 1-hexene/Ethylene ratio (% by vol) | Nitrogen (% by vol) | Productivity g/g of cat |
|---|---|---|---|---|---|
| 1 | 330 | 68 | 0.15 | 30 | 1500 |

Example 2

Polymerization

The polymerization of catalyst 1 was carried out in a fluidized-bed reactor having a diameter of 0.5 m. The polymerization temperature was 100° C. and the total pressure of the reactor was 24 bar-g. The catalyst 1 was injected and 0.25 g of triisobutylaluminum per hour were metered. Comonomer used is 1-Hexene. Propane has been used as inert gas. The output productivity and the composition of the reactor gas are reported in table 2.

TABLE 2

| ex | Gas speed $m^3$/h | Ethylene (% by vol) | 1-hexene/Ethylene ratio (% by vol) | Propane (% by vol) | Productivity g/g of cat |
|---|---|---|---|---|---|
| 1 | 330 | 57.7 | 0.11 | 36 | 1200 |

The polymers of examples 1 and 2 have been with extruded in pellets and stabilized with the following composition:

| 500 ppm | Ca-Stearate |
| 1600 ppm | Hostanox PAR 24 FF |
| 800 ppm | Irganox 1010 |
| 500 ppm | Zn-Stearate |

Then the polymers of examples 1 and 2 have been analyzed the results are reported on table 3

|  | Example 1 | Example 2 |
|---|---|---|
| Density g/cm3 | 0.929 | 0.929 |
| Melt Flow Rate (MFR) (@2.16 kg, 190° C.) g/10' | 3.74 | 1.16 |
| total comonomer content % wt | 10.0 | 7.5 |
| 1-butene derived units % wt | <1 | <1 |
| Mw/Mn | 6 | 10.3 |
| IV dL/g | 1.43 | 1.79 |
| HDF wt % | 45 | 38 |
| TREF analysis | Two maximum peaks | Two maximum peaks |
| Comonomer content LDF wt % | 17.2 | 11.7 |

Samples of the polymers have been fractionated by using the Holtrup analysis according to the procedure reported above. The results are reported on tables 4 and 5

TABLE 4

| Fraction of ex 1 | IV [d/g] | C % [wt %] | HDPE [wt %] | Cf [wt %] | Cf/HDPE | C %/IV | −0.0075* HDPE +0.58 | % of material |
|---|---|---|---|---|---|---|---|---|
| 1 | nm | Nm | nm | Nm | nm | nm | nm | 1.8 |
| 2 | nm | Nm | nm | Nm | nm | nm | nm | 1.5 |
| 3 | 0.85 | 2.9 | 67 | 8.79 | 0.13 | 3.41 | 0.07 | 15.6 |
| 4 | 0.94 | 11 | 49 | 21.57 | 0.44 | 11.70 | 0.03 | 27.59 |
| 5 | 1.93 | 12 | 34 | 18.18 | 0.53 | 6.22 | 0.15 | 39.59 |
| 6 | 2.51 | 9 | 42 | 15.52 | 0.37 | 3.59 | 0.40 | 10.24 |
| 7 | 4.66 | 3 | 75 | 12.00 | 0.16 | 0.64 | 0.29 | 2.54 |
| 8 | nm | Nm | nm | Nm | nm | nm | nm | 1.1 |
| 9 | nm | Nm | nm | Nm | nm | nm | nm | 0 |
| 10 | nm | Nm | nm | Nm | nm | nm | nm | 0 |
| 11 | nm | Nm | nm | Nm | nm | nm | nm | 0 |
| 12 | nm | Nm | nm | Nm | nm | nm | nm | 0 | nm = not measured

TABLE 5

| Fraction of ex 2 | IV [d/g] | C % [wt %] | HDF [wt %] | Cf [wt %] | Cf/HDPE | C %/IV | −0.0075* HDPE +0.58 | % of material |
|---|---|---|---|---|---|---|---|---|
| 1 | nm | Nm | nm | Nm | nm | nm | nm | 1.54 |
| 2 | nm | Nm | nm | Nm | nm | nm | nm | 1.87 |
| 3 | 0.35 | 3 | 66 | 8.82 | 0.13 | 8.57 | 0.09 | 8.85 |
| 4 | 0.72 | 6.1 | 56 | 13.86 | 0.25 | 8.47 | 0.16 | 19.53 |
| 5 | 1.74 | 9.5 | 28 | 13.19 | 0.47 | 5.46 | 0.37 | 35.96 |
| 6 | 3.03 | 8.4 | 17 | 10.12 | 0.60 | 2.77 | 0.45 | 26.89 |
| 7 | 3.55 | 7.6 | 44 | 13.57 | 0.31 | 2.20 | 0.25 | 4.42 |
| 8 | nm | nm | nm | Nm | nm | nm | nm | 0.75 |
| 9 | nm | nm | nm | Nm | nm | nm | nm | 0.05 |
| 10 | nm | nm | nm | Nm | nm | nm | nm | 0.01 |
| 11 | nm | nm | nm | Nm | nm | nm | nm | 0 |
| 12 | nm | nm | nm | Nm | nm | nm | nm | 0 | nm = not measured

Comparative Example 1

Example 1 of WO 2007/060115 has been repeated to obtain polymer of the comparative example 1, the polymer obtained has been extruded in pellets and stabilized with the same composition used for examples 1 and 2. the features of the obtained polymer are reported on table 6

| | Comparative Example 1 |
|---|---|
| Density g/cm3 | 0.939 |
| Melt Flow Rate (MFR) (@2.16 kg, 190° C.) g/10' | 28 |
| total comonomer content % wt | 3.0 |
| 1-butene derived units % wt | <1 |
| Mw/Mn | 14.4 |
| IV dL/g | 2.1 |
| HDF wt % | 51 |
| TREF analysis | Two maximum peaks |
| Comonomer content LDF wt % | 5.1 |

Samples of the polymer have been fractionated by using the Holtrup analysis according to the procedure reported above. The results are reported on table 7

TABLE 7

| comp ex 1 | IV [d/g] | C % [wt %] | HDPE [wt %] | Cf [wt %] | Cf/HDPE | C %/IV | −0.0075* HDPE +0.58 | % of material |
|---|---|---|---|---|---|---|---|---|
| 1 | nm | nm | Nm | Nm | nm | nm | nm | 1.3 |
| 2 | Nm | Nm | nm | Nm | nm | nm | Nm | 1.7 |
| 3 | 0.4 | 0.7 | 57 | 1.66 | 0.03 | 1.40 | 0.15 | 7.03 |
| 4 | 0.58 | 0.48 | 61 | 1.23 | 0.02 | 0.83 | 0.12 | 18.65 |
| 5 | 1.24 | 3.4 | 50 | 6.77 | 0.14 | 1.60 | 0.21 | 23.72 |
| 6 | 2.98 | 4 | 27 | 5.47 | 0.20 | 1.34 | 0.38 | 35.14 |
| 7 | 4.49 | 4.8 | 37 | 6.21 | 0.27 | 1.07 | 0.30 | 11.31 |
| 8 | nm | Nm | nm | Nm | nm | nm | nm | 0.63 |
| 9 | Nm | Nm | nm | Nm | nm | nm | nm | 0.04 |
| 10 | Nm | Nm | nm | Nm | nm | nm | nm | 0 |

TABLE 7-continued

| comp ex 1 | IV [d/g] | C % [wt %] | HDPE [wt %] | Cf [wt %] | Cf/HDPE | C %/IV | −0.0075* HDPE +0.58 | % of material |
|---|---|---|---|---|---|---|---|---|
| 11 | Nm | Nm | Nm | Nm | nm | nm | nm | 0 |
| 12 | nm | Nm | nm | Nm | nm | nm | nm | 0 | nm = not measured

Samples of polymer obtained in examples 1, 2 and comparative example 3 has been used for measuring some mechanical properties. The results are reported in the following table 8:

TABLE 8

|  |  | Ex 1 | Ex 2 | Com ex 1 |
|---|---|---|---|---|
| E-modulus | MPa | 550 | 447 | 310 |
| Tensile strain at breack | % | 380 | 300 | 180 |
| Charpy Notch (−30° C.) | KJ/m² | 82 | 71 | 7.4 |

From table 8 it is clear that the material of examples 1 and 2 is considerably softer and elastic than the material of the comparative example 1.

The invention claimed is:

1. A multimodal ethylene copolymer having a comonomer selected from a group consisting of derived units of alpha olefins of formula $CH_2=CHT$ wherein T is a $C_3$-$C_{10}$ alkyl group; said copolymer having the following properties:
   i) a density in the range from 0.880 to 0.955 g/cm³;
   ii) a total comonomer content ranging from 6% to 25% by weight;
   iii) a content of 1-butene derived units ranging between 0.1 to 2% by weight;
   iv) a Mw/Mn comprised from 4 to 20;
   v) an intrinsic viscosity (decalin at 135° C. as determined according to EN ISO 1628-312003) comprised between 1.0 and 4.0 dL/g;
   said multimodal ethylene copolymer comprises from 10% to 80% by weight of a first polyethylene component and being with a CRYSTAF® apparatus at a temperature higher than 75° C. and from 90% to 20% by weight of a second polyethylene component being a copolymer comprising 5% to 40% by weight of derived units of alpha olefins of formula $CH_2=CHT$ and being detected with a CRYSTAF® apparatus at a temperature lower than 75° C.;
   wherein said multimodal ethylene copolymer being fractionated into 12 fractions by means of the Holtrup analysis, the fractions containing more than 2% by weight of the total amount of material meet the following relationship:

$Cf/HDPE > -0.0075 HDPE + 0.58$;

wherein Cf is the amount (% wt) of comonomer of formula $CH_2=CHT$ in the copolymer of the fraction and HDPE is the amount (% wt) of any homopolymer component present in the fraction.

2. The multimodal ethylene copolymer according to claim 1 wherein:
   i) density comprised in the range from 0.890 and 0.935 g/cm³;
   ii) total comonomer content ranging from 6% to 12% by weight;
   iii) content of 1-butene derived units ranging from 0.1 to 1% by weight;
   iv) Mw/Mn comprised from 5 to 20; and
   v) intrinsic viscosity (decalin at 135° C. as determined according to EN ISO 1628-312003) comprised between 1.2 and 3.0 dL/g;
   said multimodal ethylene copolymer comprises from 40% to 80% by weight of a first polyethylene component and being detected with a CRYSTAF® apparatus at a temperature higher than 75° C. and from 60% to 20% by weight of a second polyethylene component being a copolymer being detected with a CRYSTAF® apparatus at a temperature lower than 75° C.

3. The multimodal ethylene copolymer according to claim 1 wherein the second polyethylene component being detected with the CRYSTAF® apparatus a temperature lower than 75° C. is a copolymer containing from 5 to 40% by weight of derived units of alpha olefins of formula $CH_2=CHT$.

4. The multimodal ethylene copolymer according to claim 1 wherein once fractionated into 12 fractions by means of the Holtrup analysis, the fractions containing more than 2% by weight of the total amount of material meet the following relationship:

$Cf/HDPE > -0.0075 HDPE + 0.60$;

wherein Cf is the amount (% wt) of comonomer of formula $CH_2=CHT$ in the copolymer of the fraction and HDPE is the amount (% wt) of the homopolymer component present in the fraction.

5. The multimodal ethylene copolymer according to claim 1 wherein second polyethylene component is a copolymer containing 10 to 30% by weight of derived units of alpha olefins of formula $CH_2=CHT$, being detected with the CRYSTAF® apparatus at a temperature lower than 75° C.

6. The multimodal ethylene copolymer according to claim 1 wherein the density is between 0.910 to 0.932 g/cm³.

7. The multimodal ethylene copolymer according to claim 1 wherein the total comonomer content ranges from 7% to 11% by weight.

8. The multimodal ethylene copolymer according to claim 1 wherein the distribution of molecular weight Mw/Mn is from 6 to 11.

9. The multimodal ethylene copolymer according to claim 1 wherein the intrinsic viscosity (decalin at 135° C. as determined according to EN ISO 1628-312003) is between 1.2 and 3 dL/g.

10. The multimodal ethylene copolymer according to claim 1 wherein the alpha olefins of formula $CH_2=CHT$ are selected from 1-butene, 1-pentene, 1-hexene, 1-octene, 1-decene, or 1-dodecene.

11. The multimodal ethylene copolymer according to claim 10 wherein the alpha olefins of formula $CH_2=CHT$ are selected from 1-butene, 1-hexene or 1-octene.

12. The multimodal ethylene copolymer according to claim 10 wherein the alpha olefins of formula $CH_2=CHT$ is 1-hexene.

* * * * *